No. 738,398. Patented September 8, 1903.

UNITED STATES PATENT OFFICE.

JULES ADOLPHE BESSON, OF CAEN, FRANCE.

PROCESS OF PURIFYING AND CONCENTRATING SUGAR-JUICES.

SPECIFICATION forming part of Letters Patent No. 738,398, dated September 8, 1903.

Application filed March 31, 1902. Serial No. 100,823. (No specimens.)

*To all whom it may concern:*

Be it known that I, JULES ADOLPHE BESSON, a citizen of the French Republic, and a resident of Caen, France, have invented certain new and useful Improvements in Processes of Purifying and Concentrating Sugar-Juices, of which the following is a specification.

This invention has for its object to facilitate and quicken the boiling of the sugar-juices in the concentrator and concurrently by the same means to purify them, so that the concentration is effected more rapidly and at a lower temperature than has hitherto been possible with the methods of discoloring purification heretofore used and the attendant decrease of viscidity and so also that the purification is more thoroughly accomplished.

In my invention the juices of beet-roots, sugar-cane, or other sugar solutions containing organic and mineral impurities, whatever may have been the prior processes to which they have been submitted, are mixed at the time of concentration with extremely comminuted metallic powders.

In practice about one gram of powdered aluminium or alloy is employed for one hundred kilograms of juice at 5° to 6° Baumé. The metallic powder is generally added to the juice in the feeding-vat of the evaporator.
At definite intervals of time (half hourly, for example) a quantity of powder corresponding to the demand during that period is added and mixed summarily by means of a suitable agitator. The powder, held in suspension in the juice, penetrates through it into the concentrating apparatus. It will be known that the dose of reagent is sufficient when the syrup leaving the apparatus still contains metallic particles which have not been attacked.

During all the period of concentration the aluminium is attacked according to the equation:

$$Al_2 + 6H_2O = Al_2(OH)_6 + 3H_2.$$

The alumina forms a precipitate, which draws with it lime, silica, various mineral and organic matters, as well as some coloring-matters. This precipitate remains in suspension in the syrup and resists the incrustation of the kettles. It is separated ultimately by the filtration of the syrup. As to the hydrogen set free, it reduces and destroys certain coloring-matters. Besides, it promotes by its release the formation of vapor-bubbles, since each metallic particle becomes, with its sheath of hydrogen, the center of the production of vapory bubbles. By reason of this activity of ebullition as much as by the resistance to incrustation the yield of the evaporatory apparatus is augmented.

I claim—

An improved process of purifying and concentrating sugar-juices consisting in boiling said juices in a suitable boiling-pan and at definite intervals of time adding thereto a quantity of powdered aluminium and thoroughly mixing said metallic powder with the juice.

In testimony whereof I have hereunto set my hand in presence of two witnesses.

JULES ADOLPHE BESSON.

Witnesses:
E. SAUVAGE,
J. DUNOIS.